United States Patent [19]

Beffa

[11] Patent Number: 4,650,859

[45] Date of Patent: Mar. 17, 1987

[54] CHROME AZO AND/OR AZOMETHINE DYES CONTAINING A BENZTHIAZOLYLPHENYL OR STILBENYL RADICAL

[75] Inventor: Fabio Beffa, Riehen, Switzerland

[73] Assignee: Ciba-Geigy Corporation, Ardsley, N.Y.

[21] Appl. No.: 688,087

[22] Filed: Dec. 31, 1984

[30] Foreign Application Priority Data

Jan. 6, 1984 [CH] Switzerland ............................... 53/84

[51] Int. Cl.$^4$ ...................... C09B 45/06; C09B 45/16; D06P 1/10; D06P 3/32
[52] U.S. Cl. .................................... 534/690; 534/602; 534/689; 534/695; 534/700; 534/712; 534/713; 534/722; 534/724; 534/725; 534/738
[58] Field of Search ................................ 534/695, 690

[56] References Cited

U.S. PATENT DOCUMENTS

| 4,052,374 | 10/1977 | Baumann | 534/695 |
| 4,212,801 | 7/1980 | Baumann | 534/695 |
| 4,424,153 | 1/1984 | Baumann et al. | 534/695 X |

FOREIGN PATENT DOCUMENTS

EP79858 11/1982 European Pat. Off. ............ 534/690

*Primary Examiner*—Floyd D. Higel
*Attorney, Agent, or Firm*—Roberts. Edward McC.; Meredith C. Findlay; Kevin T. Mansfield

[57] ABSTRACT

Chrome azo-azomethine dyes are disclosed which contain a benzthiazolylphenyl or stilbenyl radical bound via an aldehyde group to the aldehyde moiety of the azomethine dyes. The dyes are particularly useful for dyeing wool, polyamide and leather.

11 Claims, No Drawings

CHROME AZO AND/OR AZOMETHINE DYES CONTAINING A BENZTHIAZOLYLPHENYL OR STILBENYL RADICAL

The present invention relates to 1:2 chrome complex dyes of the formula I

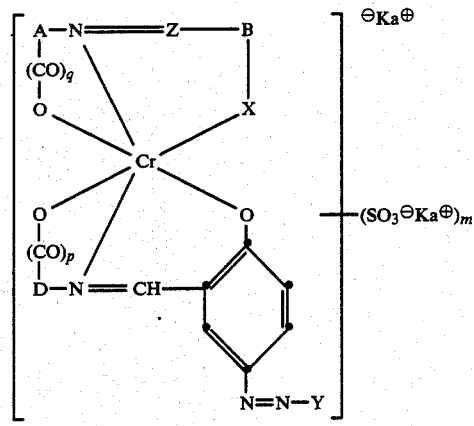

wherein

Z is nitrogen or a CH group,

A is a radical of the benzene or naphthalene series which carries a hydroxyl or carboxyl group in the o-position with respect to the azo or azomethine group, D is the radical of an o-aminophenol or, when p=1, the radical of the aliphatic, cycloaliphatic or aromatic aminocarboxylic acid, B is the radical of a coupling component when Z is nitrogen, the coupling component containing the group X in the o- or α-position with respect to the azo group, or is the radical of an o-hydroxyaldehyde when Z is the CH group, X is oxygen or, when Z is nitrogen, also a group of the formula $-NR-$, in which R is hydrogen or a $C_1-C_4$-alkyl group, Y is a radical of the formula II

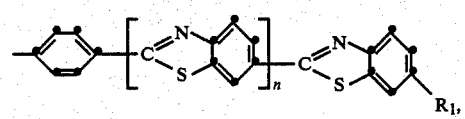

or of the formula III

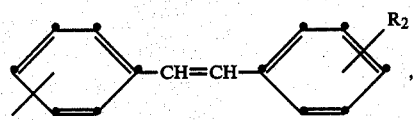

wherein n is zero or 1, $R_1$ is hydrogen or methyl, and $R_2$ is hydrogen, nitro, chlorine, $C_1-C_4$-alkyl, $C_1-C_4$-alkoxy or acetylamino, m is an integer from 1 to 6, p is zero or 1, q is zero or 1, and $Ka^\oplus$ is a kation.

The dyes of the formula I according to the invention contain 1 to 6 sulfo groups; and these are in the radicals A, B, Y or D. Preferred compounds of the formula I are those which contain 2 to 4 sulfo groups.

In the chrome complex dyes of the above formula I according to the invention, the radical A can carry one or more further substituents, for example: low-molecular alkyl or alkoxy, halogen, such as chlorine or bromine, nitro, cyano, sulfo, carboxyl, phosphono, alkylsulfonyl, such as methylsulfonyl, sulfamides, for example sulfamide or N-methylsulfamide, or acylamino. By low-molecular alkyl or alkoxy groups in this Application are in general meant those having 1 to 6, preferably 1 to 2, C atoms; and by "acylamino" are denoted low-molecular alkanoylamino, alkylsulfonylamino and alkoxycarbonylamino groups, and also aroylamino and arylsulfonylamino groups.

The radical A is derived for example from the following amines: anthranilic acid, 4- or 5-chloroanthranilic acid, 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid and 2-amino-1-hydroxybenzene-4,6-disulfonic acid.

Applicable for A in place of the aforementioned amines having hydroxyl groups are also corresponding methoxy compounds or corresponding compounds of which the hydroxyl group has been tosylated, such as anisidine, 4- or 5-chloroanisidine, 4- or 5-nitroanisidine, anisidine-4- or -5-sulfonic acid, or tosylated 1-hydroxy-2-aminobenzene, the methoxy or O-tosyl group being converted, before or during metallisation, into an OH group. Compounds having these groups are used in particular when the corresponding 1-hydroxy-2-amino compounds do not couple well.

In preferred dyes of the formula I, A is the radical of a 1-hydroxy-2-aminobenzene, which is unsubstituted or substituted by halogen, nitro, sulfo, or low-molecular alkyl or alkoxy, or is the radical of a 1-amino-2-hydroxy-4-sulfonaphthalene, which is unsubstituted or substituted in the 6-position by halogen, such as bromine or especially chlorine, or by nitro or sulfo.

The radical B is derived preferably from the following groups of coupling components: phenols which couple in the o-position and which are unsubstituted or substituted by low-molecular alkyl or alkoxy, dialkylamino or acylamino, where acylamino is $C_1-C_4$-alkanoylamino, $C_1-C_4$-alkysulfonylamino, $C_1-C_4$-alkoxycarbonylamino, aroylamino or arylsulfonylamino groups; naphthols, which are unsubstituted or substituted by $C_1-C_4$-alkyl or -alkoxy, chlorine, amino, acylamino or sulfo, acylamino being as defined above; 5-pyrazolones or 5-aminopyrazoles, preferably those which have in the 1-position a phenyl or naphthyl group which is unsubstituted or substituted by chlorine, nitro, $C_1-C_4$-alkyl or -alkoxy groups of sulfo groups, and have in the 3-position a $C_1-C_4$-alkyl or carboxyl group, especially a methyl group; naphthylamines which are unsubstituted or substituted by sulfo, sulfonamido or sulfone groups; acetoacetic acid amides, particularly acetoacetic acid anilides, and benzoylacetic acid anilides, which can be unsubstituted or substituted in the anilide nucleus by chlorine, bromine, nitro, $C_1-C_4$-alkyl or -alkoxy or sulfo groups; 6hydroxy-3-cyano- or 6-hydroxy-3-carbonamide-4-alkyl-2-pyridones, which are substituted in the 1-position by unsubstituted or substituted $C_1-C_4$-alkyl, for example methyl, isopropyl, $\beta$-hydroxyethyl, $\beta$-aminoethyl or $\gamma$-isopropoxypropyl, or by phenyl, and which can carry in the 4-position a $C_1-C_4$-alkyl group, particularly methyl, or hydroxyquinolines.

Examples of such coupling components are: 2-naphthol, 1-naphthol, 1-acetylamino-7-naphthol, 1-propionylamino-7-naphthol, 1-carboxymethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 1-naphthol-3,6- or -4,8-disulfonic acid, 2-naphthol-6,8-disulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamino-1-sulfonic acid, 1-naphthylamino-4- or -5-sulfonic acid, 2-aminonaphthalene-6-sulfonic acid, 2-aminonaphthalene-5-sulfonic acid, 6-methylsulfonyl-2-aminonaphthalene, 1-phenyl-3-methyl-pyrazol-5-one, 1-phenyl-5-pyrazolone-3-carboxylic acid amide, 1-(2'-, 3'- or 4'-methylphenyl)-3-methylpyrazol-5-one, 1-(2'-, 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2', 5'-dichloro-4'-sulfophenyl)-3-methylpyrazol-5-one, 1-(2'-, 3'- or 4-sulfophenyl)-3-methyl-5-aminopyrazole, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidine, acetoacet-o-toluidine, acetoacet-o-chloroanilide, acetoacet-m-xylidine, tetralol, 4-methylphenol, 3-dialkylaminophenols, especially 3-dimethylamino- and 3-diethylaminophenol, 4-butylphenol, preferably 4-tert-butylphenol, 4-amylphenol, particularly 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridine, 1-phenyl-3-carbonamido-4- methyl-6-hydroxypyridone, 1-ethyl-4-hydroxy-2-quinolone, 2,4-dihydroxyquinoline or 3-methylpyrazol-5-one.

The coupling component B is preferably a 1- or 2-naphthol which is unsubstituted or substituted by amino and/or sulfo; 1- or 2-naphthylamine, unsubstituted or substituted by sulfo; or p-alkyl($C_1-C_6$)-phenol, 1-phenyl-3-methyl-5-pyrazolone or acetoacetic acid anilide, and the phenyl group in the two last-mentioned compounds can be substituted by $C_1-C_4$-alkyl, $C_1-C_4$-alkoxy, chlorine, nitro or sulfo.

When Z is the CH group, B is the radical of an o-hydroxyaldehyde, preferably of an o-hydroxybenzaldehyde or o-hydroxynaphthaldehyde, which can be substituted by low-molecular alkyl, halogen, sulfo, phenylazo, sulfophenylazo, naphthylazo or sulfonaphthylazo. Suitable aldehydes are for example: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2'-, 3'- or 4'-sulfophenylazo)-2-hydroxybenzaldehyde, 5-(6'-sulfonaphthyl-1'-azo)-2-hydroxybenzaldehyde or 5-(4''-sulfo-4'-phenylazo)-phenylazo-2-hydroxybenzaldehyde.

The radical D is derived for example from the following amines: 2-amino-1-hydroxybenzene, 4-chloro- and 4,6-dichloro-2-amino-1-hydroxybenzene, 4- or 5-nitro-2-amino-1-hydroxybenzene, 4-chloro- and 4-methyl-6-nitro-2-amino-1-hydroxybenzene, 6-acetylamino- and 6-chloro-4-nitro-2-amino-1-hydroxybenzene, 4-sulfonamido-2-amino-1-hydroxybenzene, 4-methylsulfonyl-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro- and 4-methyl-5-nitro-2-amino-1-hydroxybenzene, 3,4,6-trichloro-2-amino-1-hydroxybenzene, 4,6-dinitro-2-amino-1-hydroxybenzene, 2-amino-1-hydroxybenzene-4- or -5-sulfonic acid, 2-amino-1-hydroxybenzene-4,6-disulfonic acid, 4-nitro-2-amino-1-hydroxybenzene-6-sulfonic acid, 6-nitro-2-amino-1-hydroxybenzene-4-sulfonic acid, 6-chloro-2-amino-1-hydroxybenzene-4-sulfonic acid, 4-chloro-2-amino-1-hydroxybenzene-6-sulfonic acid, 4-methylsulfonyl-5-nitro-2-amino-1hydroxybenzene, 4-methylsulfonyl-6-nitro-2-amino-1-hydroxybenzene and 6-methyl-2-amino-1-hydroxybenzene-4-sulfonic acid.

When p=1, D is the radical of an aminocarboxylic acid, for example the radical of anthranilic acid, 4- or 5-chloroanthranilic acid, 4- or 5-sulfoanthranilic acid, glycocoll, $\alpha$-alanine, $\beta$-alanine, phenylglycine, phenylalanine, 2-aminoisobutyric acid or 2-aminocyclohexanecarboxylic acid.

In preferred dyes, D is the radical of a 1-hydroxy-2-aminobenzene, which can be further substituted by nitro, sulfo, chlorine, methyl or methoxy.

The dyes of the formula I according to the invention contain a radical Y of the formula II

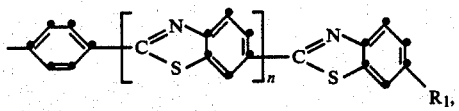  (II)

or of the formula III

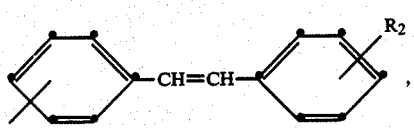  (III)

wherein n is zero or 1, $R_1$ is hydrogen or methyl, and $R_2$ is hydrogen, nitro, chlorine, $C_1$–$C_4$-alkyl, $C_1$–$C_4$-alkoxy or acetylamino.

The radicals of the formulae II and III can carry one or more sulfo groups. In the case of the radical of the formula II, $R_1$ is preferably methyl. The preferred meaning of n is zero. The dyes of the formula I which contain a radical Y of the formula II are however usually in the form of mixtures of compounds wherein n is zero with a proportion of compounds wherein n is 1. This is determined by the synthesis, in which customarily the starting material is dehydrothio-p-toluidine, which contains as by-product bis-dehydro-thio-p-toluidine (primuline base). In the radical Y of the formula III, $R_2$ is preferably hydrogen, nitro, chlorine, methoxy or acetylamino, hydrogen and nitro being particularly preferred.

Suitable radicals of the formula Y are derived for example from the following amines: dehydrothio-p-toluidine (6-methyl-2-(4'-aminophenyl)-benzothiazole), dehydrothio-p-toluidine-7-sulfonic acid, dehydrothio-p-toluidine-3'-sulfonic acid, dehydrothio-p-toluidine-5,7-disulfonic acid, dehydrothio-p-toluidine-7,3'-disulfonic acid, primuline base, 2-(4'-aminophenyl)-benzothiazole, as well as sulfonic acids of the two last-mentioned compounds, 4-aminostilbene, 4-aminostilbene-2-sulfonic acid, 4-aminostilbene-2'-sulfonic acid, 4-aminostilbene-2,2'-disulfonic acid, 4-amino-4'-nitrostilbene-2,2'-disulfonic acid, 4-amino-4'-chlorostilbene, 4-amino-2'-chlorostilbene, 4-amino-4'-chlorostilbene-2-sulfonic acid, 4-amino-4'-chlorostilbene-2,2'-disulfonic acid, 4-amino-4'-methylstilbene, 4-amino-2',4'-dimethylstilbene, 4-amino-4'-methoxystilbene-2-sulfonic acid, 4-amino-3',4'-dimethoxystilbene-2-sulfonic acid and 4-amino-4'-acetylaminostilbene-2-sulfonic acid.

Preferred amongst these are dehydrothio-p-toluidine, dehydrothio-p-toluidine-7-sulfonic acid, 4-aminostilbene-2-sulfonic acid and 4-amino-4'-nitrostilbene-2,2'-disulfonic acid.

Particularly preferred dyes according to the invention correspond to the formula IV

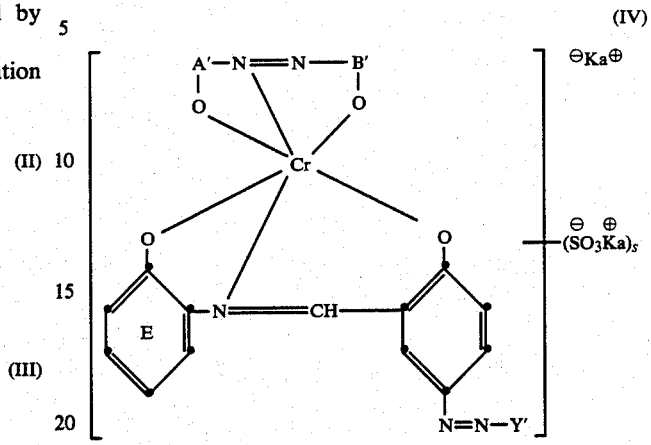  (IV)

wherein

A' is the radical of a 1-hydroxy-2-aminobenzene, which is unsubstituted or substituted by halogen, nitro, sulfo or low-molecular alkyl or alkoxy, or is the radical of a 1-amino-2-hydroxy-4-sulfonaphthalene, which is unsubstituted or substituted in the 6-position by chlorine, nitro or sulfo, B' is a 1- or 2-naphthol which is unsubstituted or substituted by amino and/or sulfo, a 1- or 2-napthylamine, unsubstituted or substituted by sulfo, or is p-alkyl ($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine, nitro or sulfo, Y' is a radical of the formula V

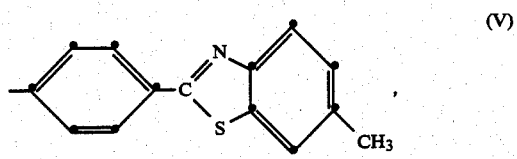  (V)

or of the formula VI

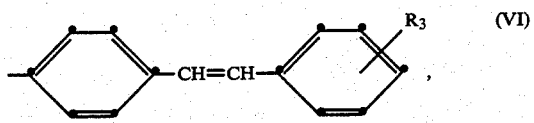  (VI)

wherein $R_3$ is hydrogen, nitro, chlorine, methoxy, methyl or acetylamino, and the radicals V and VI can contain one or two sulfo groups, s is 2, 3 or 4, and $Ka^⊕$ is a cation, and the ring E is unsubstituted or substituted by nitro, chlorine, methyl, methoxy or sulfo.

The dyes of the formula I according to the invention can be produced by methods known per se, for example by producing the 1:1 chrome complex of the azo or azomethine dye of the formula VII

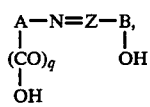

(VII)

and then reacting this with the dye of the formula VIII

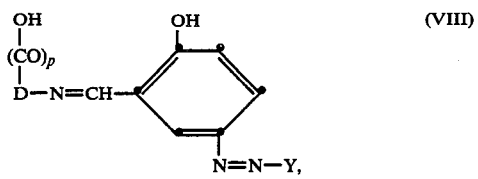

or preferably with a mixture of the amine of the formula IX

and the aldehyde of the formula X

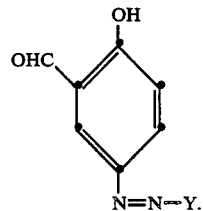

In the formulae VII to X, the symbols A, Z, B, D, Y, p and q have the meanings defined under the formula I.

The 1:1 chrome complex is produced by methods known per se, preferably in an acid solution with chromium-III salts. The 1:1 chrome complex is subsequently reacted in a slightly acid, neutral or slightly alkaline medium to the 1:2 chrome complex.

The novel metal-complex dyes of the formula I which are obtainable by the above process are isolated in the form of their salts, particularly alkali metal salts, especially sodium or lithium salts, or ammonium salts, or salts of organic amines having a positively charged nitrogen atom, and are suitable for dyeing and printing various materials, in particular however for dyeing and printing nitrogen-containing materials, especially leather. Dyes having 1 to 3 sulfo groups are furthermore suitable for dyeing silk and wool, as well as synthetic fibres made from polyamides or polyurethanes.

Orange or brown to olive dyeings having good fastness properties, particularly good fastness to light and to wet processing, are obtained.

The preferred use of the dyes according to the invention is for the dyeing of furs or leather, all types of leather being suitable, for example chrome leather, re-tanned leather or suède leather, of the goat, cow or pig. The dyes according to the invention which have 4 to 6 sulfo groups are suitable in particular for dyeing suède leather, since these dyes have good levelling properties and penetrate well.

The following examples serve to further illustrate the invention without the scope thereof being limited by them. The term 'parts' denotes parts by weight, and percentages are percent by weight.

EXAMPLE 1

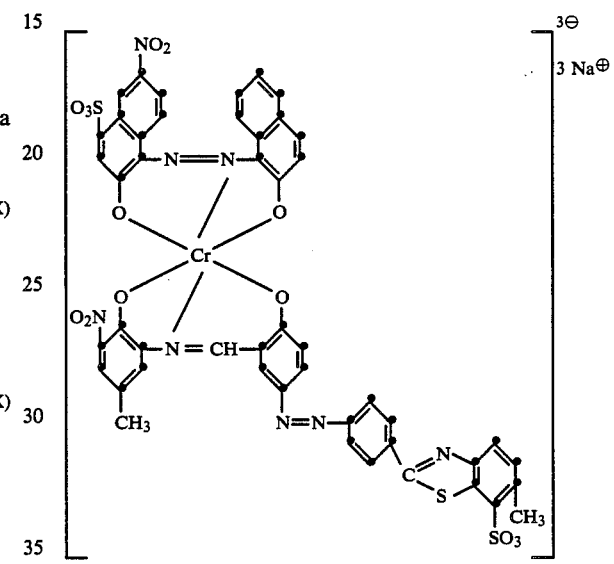

In 600 parts of water are suspended 48.9 parts of the complex chromium compound of the type 1 atom of chromium: 1 molecule of dye (which contains 5.2 parts of chromium and 43.9 parts of the monoazo dye formed from diazotised 6-nitro-1-amino-2-hydroxynaphthalene-4-sulfonic acid and 2-hydroxynaphthalene) with 16.8 parts of 6-nitro-4-methyl 2-amino-1-hydroxybenzene and 45.3 parts of the monoazo dye formed from diazotised dehydrothio-p-toluidine-7-sulfonic acid and salicylaldehyde. The reaction mixture is heated to 80° to 85° C.; the pH value is adjusted to 7 to 7.5 with 5N sodium hydroxide, and the reaction mixture is held at this temperature and at a constant pH value until the starting products are no longer detectable. After completion of the addition reaction, the dye is precipitated by the addition of sodium chloride, filtered and dried. After drying, it is in the form of a dark powder which dissolves in water to give a brown colour, and dyes wool, polyamide material and leather in brown shades having good fastness properties.

EXAMPLE 2

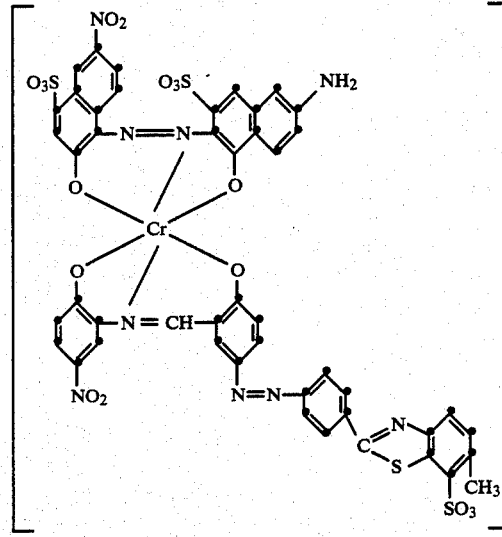

The 1:1 chrome complex containing 53.4 parts of the dye formed from diazotised 6-nitro-1-amino-2-hydroxynaphthalene-4-sulfonic acid and 2-amino-5-hydroxynaphthalene-7-sulfonic acid, as well as 5.2 parts of chromium, is introduced into 600 parts of water; there are subsequently added 15.4 parts of 4-nitro-2-amino-1-hydroxybenzene and 45.3 parts of the monoazo dye formed from diazotised dehydrothio-p-toluidine-7-sulfonic acid and salicylaldehyde. The reaction mixture is then heated to 80° to 85° C.; the pH value is adjusted to 7 with sodium hydroxide, and the mixture is held at this temperature and at a constant pH value until the starting products are no longer detectable. After completion of the reaction, the dye is isolated by concentration by evaporation. There is thus obtained a dark powder which dissolved in water to give an olive-green colour, and which dyes leather in fast olive shades.

EXAMPLE 3

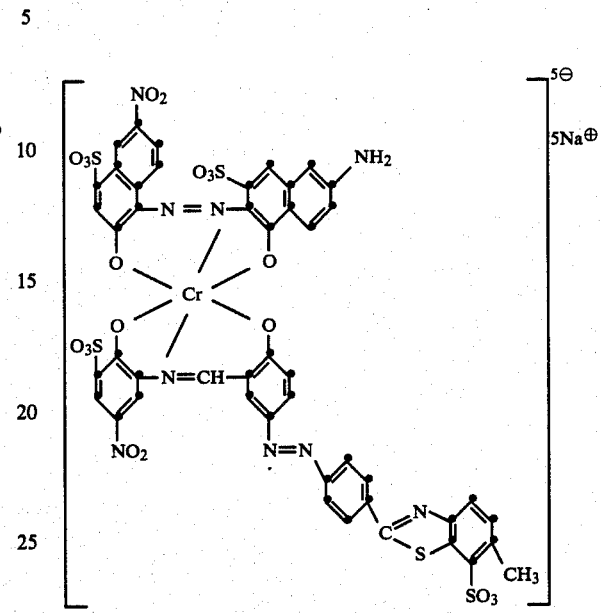

In 500 parts of water are suspended 58.4 parts of the complex chromium compound of the type 1 atom of chromium: 1 molecule of dye (which contains 5.2 parts of chromium and 53.4 parts of the monoazo dye formed from 6-nitro-1-amino-2-hydroxynaphthalene-4-sulfonic acid and 2-amino-5-hydroxynaphthalene-7-sulfonic acid) with 23.4 parts of 4-nitro-2-amino-1-hydroxybenzene-6-sulfonic acid and 45.3 patts of the monoazo dye formed from diazotised dehydrothio-p-toluidine-7-sulfonic acid and salicylaldehyde. The reaction mixture is heated to 80° to 85° C.; the pH value is adjusted to 7 to 7.5 with 5N sodium hydroxide, and the mixture is held at this temperature and at a constant pH value until the addition reaction is completed. The chromium-containing dye is subsequently isolated by spray drying. There is obtained a dark powder which dissolved in water to give a greenish-olive shade, and which dyes leather in fast olive shades.

EXAMPLE 4

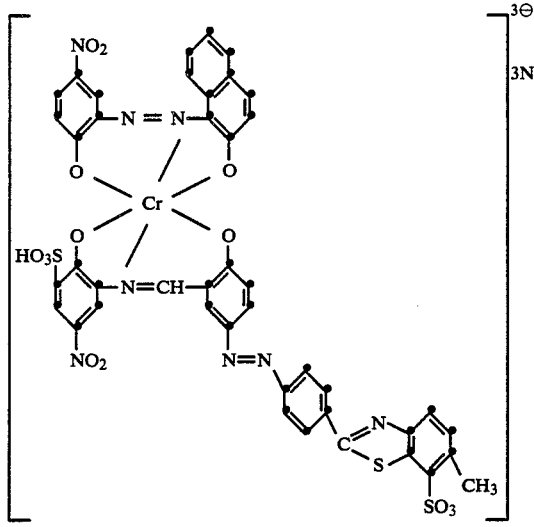

30.9 parts of the monoazo dye formed from diazotised 4-nitro-2-amino-1-hydroxybenzene and 2-hydroxynaphthalene are stirred up with 26.7 parts of chromic chloride hexahydrate in 400 parts by volume of ethylene glycol at 120° to 125° C. until no further unchromed dye is detectable. To the resulting solution of the 1:1 chrome complex dye at 80° to 85° C. are thereupon added 23.4 parts of 4-nitro-2-amino-1-hydroxybenzene-6-sulfonic acid and 45.3 parts of the monoazo dye formed from diazotised dehydrothio-p-toluidine-7-sulfonic acid and salicylaldehyde, and the mixture is held at this temperature until the addition reaction has finished. The pH value of the reaction mixture is adjusted to and maintained at 7 to 7.5 during the reaction by the addition of 5N sodium hydroxide solution. After completion of the reaction, the chromium-containing dye is precipitated by the addition of a saturated sodium chloride solution, filtered off and dried. It is in the form of a dark powder which dissolves in water to give a brown colour, and which dyes wool, polyamide material and leather in brown shades having good fastness properties.

When the procedure is carried out as described in the Examples 1 to 4 except that the 1:1 chrome complex of the respective azo dye given in column 2 of the following Table is used, and is reacted with the azomethine dye shown opposite in column 3, or with the amine and aldehyde forming this dye, there is obtained in each case a 1:2 chrome complex which dyes leather in the shade indicated in column 4.

TABLE

| No. | Azo dye | Azomethine dye | Shade |
|---|---|---|---|
| 1 | (structure) | (structure) | brownish-olive |
| 2 | (structure) | " | olive |
| 3 | (structure) | " | brownish-olive |
| 4 | (structure) | " | olive-brown |

TABLE-continued

| No. | Azo dye | Azomethine dye | Shade |
|---|---|---|---|
| 5 | [structure: 2-hydroxy-4-nitrophenyl-azo-1-amino-2-naphthol-sulfonic acid] | " | greenish-olive |
| 6 | [structure: 2-hydroxy-5-sulfophenyl-azo-1-hydroxy-naphthalene] | " | olive-brown |
| 7 | [structure: 3-sulfo-2-hydroxy-5-nitrophenyl-azo-1-hydroxy-2-sulfo-6-amino-naphthalene] | " | olive |
| 8 | [structure: 3-sulfo-2-hydroxy-5-nitrophenyl-azo-acetoacetanilide enol] | " | orange-yellow |
| 9 | [structure: 2-hydroxy-4-nitrophenyl-azo-pyrazolone with sulfophenyl] | " | orange |
| 10 | [structure: 2-hydroxy-5-sulfophenyl-azo-pyrazolone with phenyl] | " | orange |
| 11 | [structure: 2-hydroxy-4-nitrophenyl-azo-pyrazolone with phenyl] | " | orange |
| 12 | [structure: 3-sulfo-2-hydroxy-5-nitrophenyl-azo-pyrazolone with phenyl] | " | orange |

TABLE-continued

| No. | Azo dye | Azomethine dye | Shade |
|---|---|---|---|
| 13 | [structure: naphthalene-OH-N=N-naphthalene-OH with HO₃S] | " | olive |
| 14 | [structure: naphthalene with OH, HO₃S, NO₂ -N=N- naphthalene-OH] | [structure: HO₃S, OH, NO₂ phenyl -N=CH- phenyl-OH -N=N- phenyl-benzothiazole-CH₃] | brownish-olive |
| 15 | [structure: phenyl-OH, SO₃H -N=N- naphthalene-OH] | " | olive-brown |
| 16 | [structure: naphthalene with OH, HO₃S, NO₂ -N=N- naphthalene with OH, SO₃H, NH₂] | [structure: O₂N, OH, SO₃H phenyl -N=CH- phenyl-OH -N=N- phenyl-benzothiazole-CH₃, SO₃H] | olive |
| 17 | [structure: naphthalene with OH, HO₃S, NO₂ -N=N- naphthalene-OH] | [structure: OH, SO₂NH₂ phenyl -N=CH- phenyl-OH -N=N- phenyl-benzothiazole-CH₃, SO₃H] | olive-brown |
| 18 | [structure: HO₃S, OH, NO₂ phenyl -N=N- naphthalene-OH] | " | brownish-olive |
| 19 | [structure: naphthalene with OH, HO₃S -N=N- naphthalene-OH] | " | olive |

| No. | Azo dye | Azomethine dye | Shade |
|---|---|---|---|
| 20 | " | [structure: nitrophenol-N=CH-phenol-N=N-phenyl-benzothiazole with CH₃ and SO₃H] | brown |
| 21 | [structure: HO₃S, OH, NO₂ naphthol azo naphthol] | " | brown |
| 22 | [structure: HO₃S, OH, NO₂ phenyl azo OH, C₄H₉tert phenyl] | " | brown |
| 23 | [structure: HO₃S, OH, NO₂ phenyl azo OH naphthyl] | " | brown |
| 24 | [structure: OH, NO₂ phenyl azo pyrazolone with SO₃H phenyl] | " | brownish-orange |
| 25 | [structure: HO₃S, OH, NO₂ phenyl azo pyrazolone with phenyl] | " | brownish-orange |
| 26 | [structure: OH, SO₃H phenyl azo pyrazolone with phenyl] | " | brownish-orange |
| 27 | [structure: O₂N, OH, SO₃H phenyl azo naphthol] | " | olive-brown |

TABLE-continued

| No. | Azo dye | Azomethine dye | Shade |
|---|---|---|---|
| 28 | [structure: naphthalene-azo-phenol with OH, SO₃H] | " | brown |
| 29 | [structure: naphthalene-azo-naphthol with OH, HO₃S, NO₂] | " | brown |
| 30 | [structure: phenol-azo-naphthylamine with OH, NH₂, O₂N, SO₃H] | " | olive-brown |
| 31 | [structure: bis-naphthalene azo with OH, HO₃S, SO₃H, NH₂, NO₂] | " | olive |
| 32 | [structure: naphthalene-azo-naphthol with OH, HO₃S, NO₂] | [structure: azomethine with OH, CH₃, N=CH, N=N, benzothiazole, CH₃, SO₃H] | olive-brown |
| 33 | [structure: naphthalene-azo-naphthol with HO₃S, OH, NO₂] | " | brown |
| 34 | [structure: naphthalene-azo-naphthol with OH, HO₃S] | " | olive |
| 35 | [structure: naphthalene-azo-naphthol with OH, HO₃S, NO₂] | [structure: azomethine with O₂N, OH, CH₃, N=CH, N=N, benzothiazole, CH₃] | brown |

TABLE-continued

| No. | Azo dye | Azomethine dye | Shade |
|---|---|---|---|
| 36 | [structure: HO₃S, OH, OH, NO₂, N=N, naphthalene] | [structure: O₂N, OH, OH, CH₃, N=CH, N=N, benzothiazole with CH₃ and SO₃H] | brown |
| 37 | [structure: OH, OH, HO₃S, N=N, naphthalene] | " | olive-brown |
| 38 | [structure: OH, OH, HO₃S, NO₂, N=N, naphthalene] | [structure: OH, OH, Cl, N=CH, N=N, benzothiazole with CH₃ and SO₃H] | brown |
| 39 | [structure: HO₃S, OH, OH, NO₂, N=N, naphthalene] | " | brown |
| 40 | [structure: OH, OH, SO₃H, N=N, naphthalene] | " | brown |
| 41 | [structure: OH, OH, HO₃S, NO₂, SO₃H, NH₂, N=N, naphthalene] | [structure: OH, OH, SO₃H, N=CH, N=N, benzothiazole with CH₃ and SO₃H] | olive |
| 42 | [structure: HO₃S, OH, OH, NO₂, HO₃S, NH₂, N=N, naphthalene] | " | olive |

TABLE-continued

| No. | Azo dye | Azomethine dye | Shade |
|---|---|---|---|
| 43 | " | 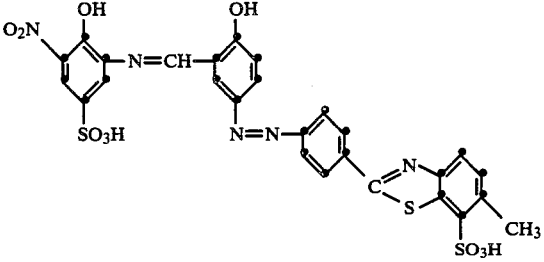 | olive |
| 44 | " | 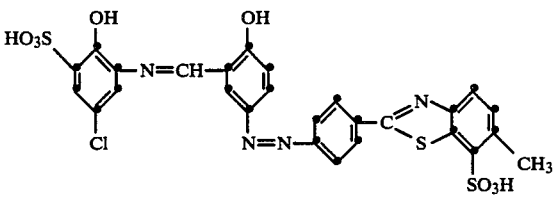 | olive |
| 45 | " | 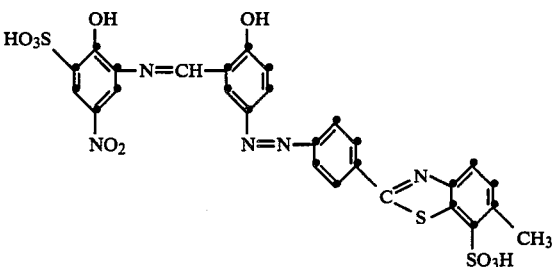 | olive |
| 46 | 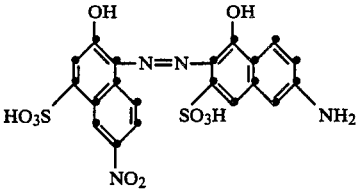 | 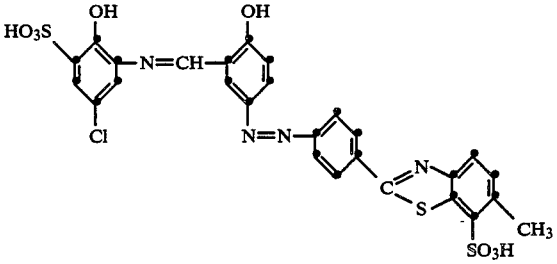 | olive |

EXAMPLE 5

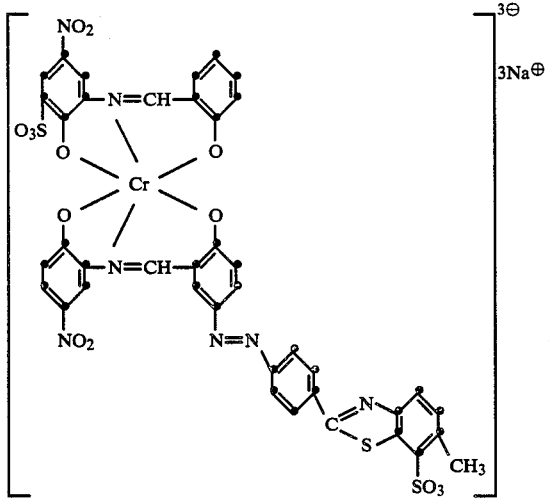

The 1:1 chrome complex containing 33.8 parts of the azomethine dye formed from 4-nitro-2-amino-1-hydroxybenzene-6-sulfonic acid and salicylaldehyde, as well as 5.2 parts of chromium, is introduced into 600 parts of water; there are subsequently added 15.4 parts of 4-nitro-2-amino-1-hydroxybenzene and 45.3 parts of the monoazo dye formed from diazotised dehydrothio-p-toluidine-7-sulfonic acid and salicylaldehyde. The reaction mixture is then heated to 80° to 85° C.; the pH value is adjusted to 7 with sodium hydroxide, and the mixture is held at this temperature and at a constant pH value until the addition reaction has finished. The chromium-containing dye is thereupon isolated by concentration by evaporation. It is a brown powder which dissolves in water to give an orange colour and dyes leather in yellowish-orange shades having good fastness properties.

When in the above Example the 15.4 parts of 4-nitro-2-amino-1-hydroxybenzene are replaced by 23.4 parts of 4-nitro-2-amino-1-hydroxybenzene-6-sulfonic acid,

EXAMPLE 6

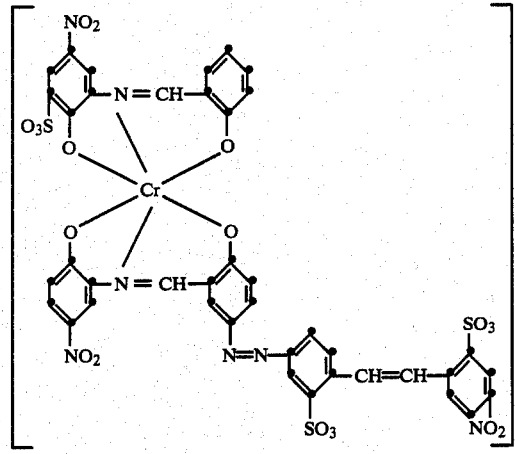

The 1:1 chromium complex containing 33.8 parts of the azomethine dye formed from 4-nitro-2-amino-1-hydroxybenzene-6-sulfonic acid and salicylaldehyde, as well as 5.2 parts of chromium, is introduced into 600 parts of water; there are subsequently added 15.4 parts of 4-nitro-2-amino-1-hydroxybenzene and 53.3 parts of the monoazo dye formed from diazotised 4'-nitro-4-aminostilbene-2,2'-disulfonic acid and salicylaldehyde. The reaction mixture is then heated to 80° to 85° C.; the pH value is adjusted to 7 with 5N sodium hydroxide, and the mixture is held at this temperature and at a constant pH value until the addition reaction has finished. The chromium-containing dye is isolated by concentration by evaporation. It is a brown powder which dissolves in water to give a yellowish-orange colour and dyes leather in fast yellowish-orange shades.

EXAMPLE 7

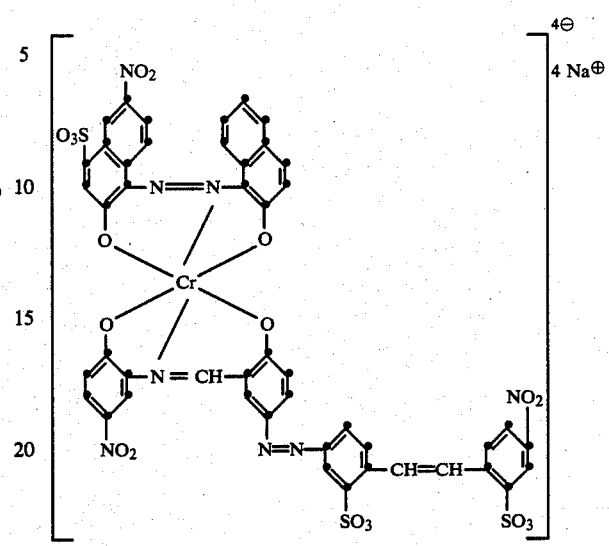

In 600 parts of water are suspended 48.9 parts of the complex chromium compound of the type 1 atom of chromium: 1 molecule of dye (which contains 5.2 parts of chromium and 43.9 parts of the monoazo dye formed from 6-nitro-1-amino-2-hydroxynaphthalene-4-sulfonic acid and 2-hydroxynaphthalene) with 15.4 parts of 4-nitro-2-amino-1-hydroxybenzene and 53.3 parts of the monoazo dye formed from diazotised 4'-nitro-4-aminostilbene-2,2'-disulfonic acid and salicylaldehyde. The reaction mixture is heated to 80° to 85° C.; the pH value is then adjusted to about 7 with 5N sodium hydroxide, and the mixture is held at this temperature and at a constant pH value until the addition reaction has finished. The dye is subsequently isolated by concentration by evaporation. It is a dark powder which dissolves in water to give a brown colour and dyes leather in fast brown shades.

When the procedure is carried out as described in Example 7, except that the 1:1 chromium complex of the respective azo dye given in column 2 of the following Table is used and is reacted with the azomethine dye shown opposite in column 3, or with the amine and aldehyde forming this dye, there is obtained in each case a 1:2 chrome complex which dyes leather in the shade of colour indicated in column 4.

TABLE

| No. | Azo dye | Azomethine dye | Shade |
|---|---|---|---|
| 1 | (structure) | (structure) | brown |
| 2 | (structure) | " | olive |
| 3 | (structure) | " | brown |

TABLE-continued
| No. | Azo dye | Azomethine dye | Shade |
|---|---|---|---|
| 4 | 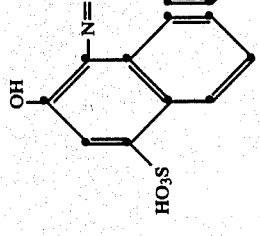 | " | olive-brown |
| 5 | 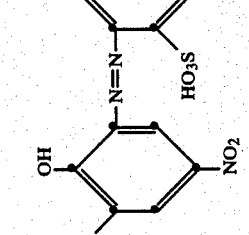 | " | brown |
| 6 | 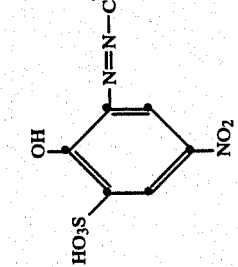 | " | orange |
| 7 | 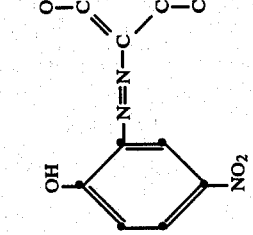 | " | orange |

TABLE-continued

| No. | Azo dye | Azomethine dye | Shade |
|---|---|---|---|
| 8 | | | brown |
| 9 | | | brown |
| 10 | | | brown |
| 11 | | | brown |

TABLE-continued
| No. | Azo dye | Azomethine dye | Shade |
|---|---|---|---|
| 12 | 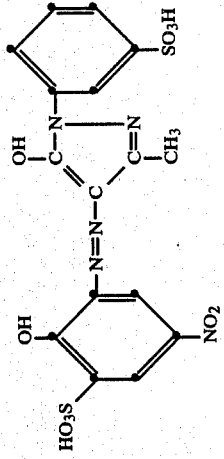 | " | orange |
| 13 | 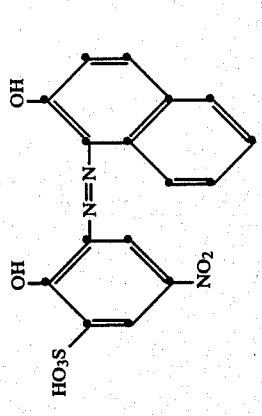 | 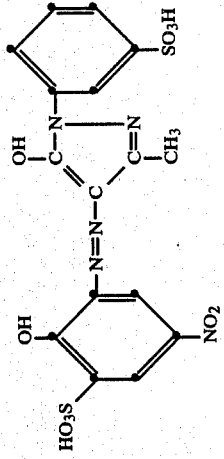 | brown |
| 14 | " | 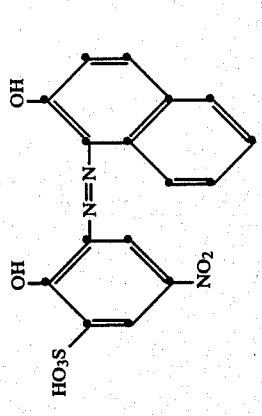 | brown |

TABLE-continued
| No. | Azo dye | Azomethine dye | Shade |
|---|---|---|---|
| 15 | 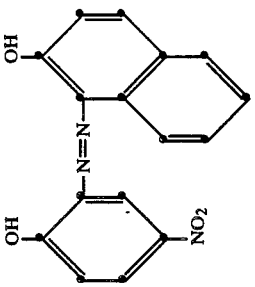 | " | brown |
| 16 | " | 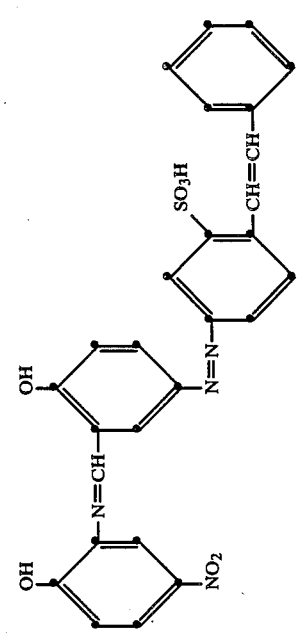 | brown |
| 17 | 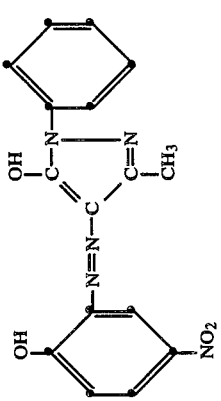 | " | orange |

TABLE-continued

| No. | Azo dye | Azomethine dye | Shade |
|---|---|---|---|
| 18 | (structure) | (structure) | brown |
| 19 | (structure) | | yellowish-orange |
| 20 | (structure) | (structure) | olive |

TABLE-continued

| No. | Azo dye | Azomethine dye | Shade |
|---|---|---|---|
| 21 | (structure) | " | reddish-orange |
| 22 | (structure) | " | brown |
| 23 | (structure) | " | olive-brown |

TABLE-continued

| No. | Azo dye | Azomethine dye | Shade |
|---|---|---|---|
| 24 | (structure) | " | brown |
| 25 | (structure) | " | olive |
| 26 | " | (structure) | olive |

TABLE-continued
| No. | Azo dye | Azomethine dye | Shade |
|---|---|---|---|
| 27 | 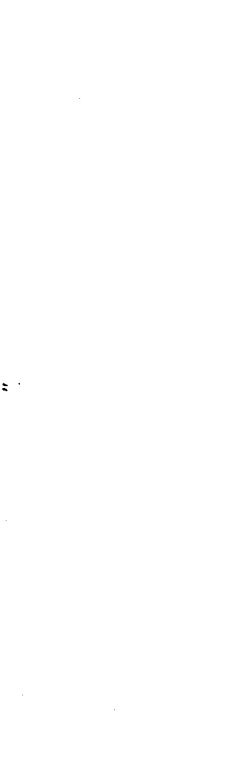 | 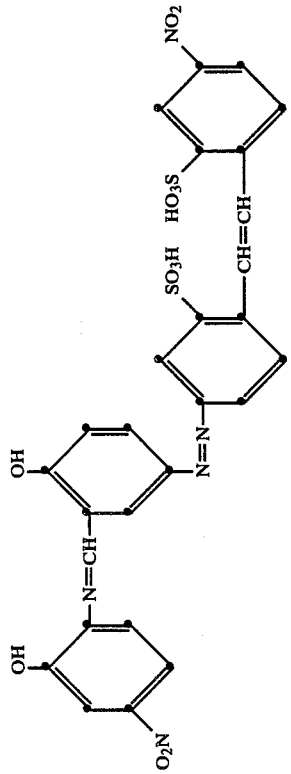 | brown |
| 28 | 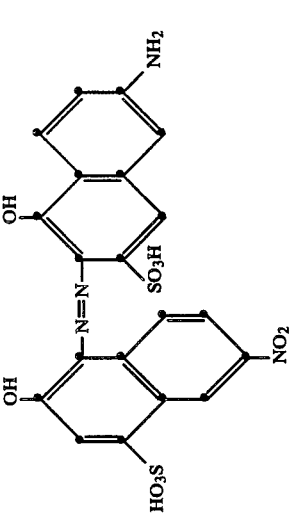 | " | brown |
| 29 | 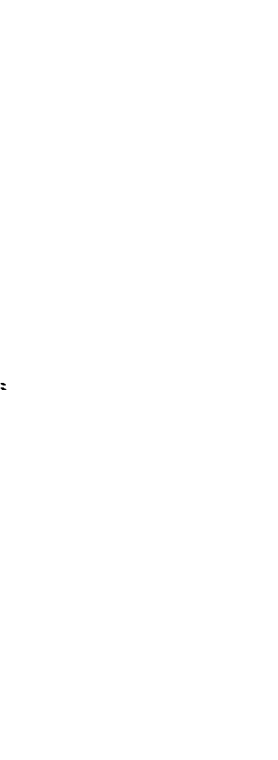 | " | brownish-olive |

TABLE-continued
| No. | Azo dye | Azomethine dye | Shade |
|---|---|---|---|
| 30 | 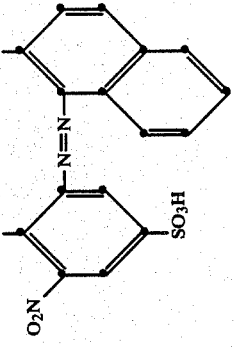 | " | brown |
| 31 | 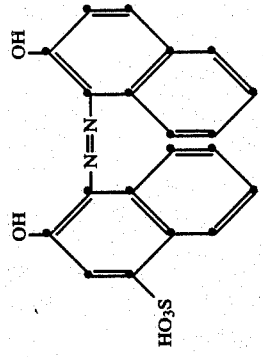 | " | brown |
| 32 | 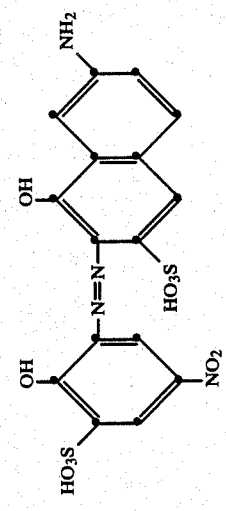 | " | brown |
| 33 | 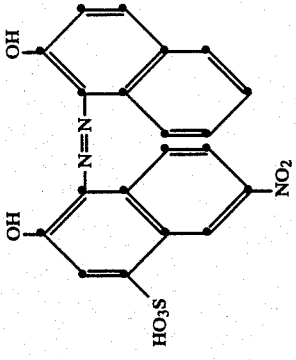 | 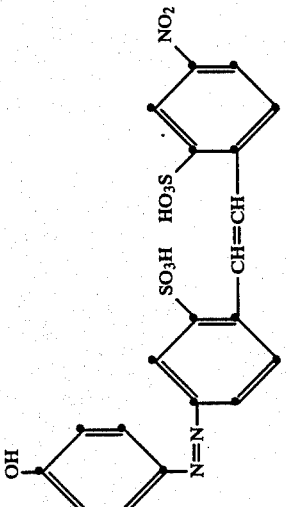 | brown |

TABLE-continued
| No. | Azo dye | Azomethine dye | Shade |
|---|---|---|---|
| 34 | 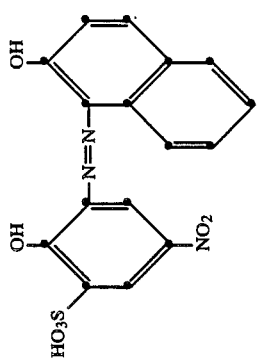 | " | brown |
| 35 | 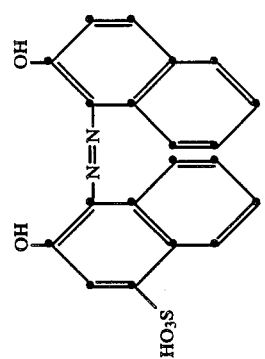 | " | brownish-olive |
| 36 | 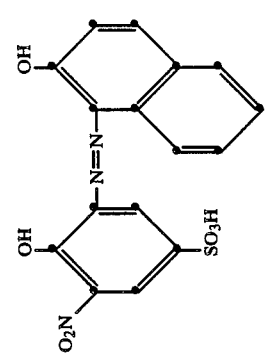 | " | brown |

TABLE-continued

| No. | Azo dye | Azomethine dye | Shade |
|---|---|---|---|
| 37 | (azo dye structure with OH, N=N, SO₃H, NO₂, NH₂, HO₃S groups) | " | olive |
| 38 | (azo dye structure with OH, N=N, HO₃S, NO₂, NH₂, HO₃S groups) | " | olive |
| 39 | (pyrazolone azo dye structure with OH, N=N, NO₂, HO₃S groups and phenyl, CH₃ substituents) | (azomethine dye structure with COOH-CH₂-N=CH, OH, N=N, SO₃H, CH=CH-phenyl groups) | orange |

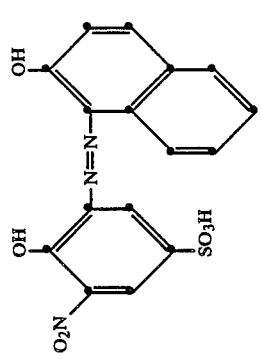

TABLE-continued

| No. | Azo dye | Azomethine dye | Shade |
|---|---|---|---|
| 43 | (structure) | (structure) | olive |
| 44 | (structure) | | brown |
| 45 | (structure) | (structure) | dark brown |

DYEING INSTRUCTIONS FOR LEATHER 100 parts of suède leather for clothing (dry weight) are wetted back at 50° C. in a solution of 1000 parts by volume of water and 2 parts of 24% ammonia for 2 hours, and subsequently dyed at 60° C. in a solution of 1000 parts by volume of water, 2 parts of 24% ammonia and 6 parts of the dye from Example 2 for 1 hour. There is then added a solution of 40 parts by volume of water and 4 parts of 85% formic acid, and dyeing is performed for a further 30 minutes. The leather is afterwards well rinsed, and optionally further treated with 2 parts of a dicyandiamide/formaldehyde condensation product at 50° C. for 30 minutes.

Other suède leathers and also glove leathers can be dyed in the same manner.

The olive dyeings thus obtained are distinguished by good fastness properties and a good covering capacity.

DYEING INSTRUCTIONS FOR POLYAMIDE 100 parts of polyamide knitting yarn are introduced at 50° C. into a dye bath containing, to 4000 parts of water, 2 parts of the dye of Example 4, 4 parts of ammonium sulfate and 2 parts of a levelling agent. The liquor is brought to boiling in the course of 45 minutes, and is held for a further 45 minutes at the boiling temperature. The dyed material is thereupon removed, thoroughly rinsed with cold water and dried. The result is a polyamide which has been dyed in a brown shade and which has good fastness properties.

DYEING INSTRUCTIONS FOR WOOL 100 parts of wool knitting yarn are introduced into a dye bath at 50° C., which contains, to 4000 parts of water, 2 parts of the dye of Example 4, 4 parts of 80% acetic acid and 2 parts of a levelling agent. The dye liquor is brought to the boiling temperature in the course of 45 minutes and is held at boiling temperature for a further 45 minutes. The dyed material is thereupon removed, thoroughly rinsed with cold water and dried. A wool which has been dyed in a brown shade and which has good fastness properties is obtained.

What is claimed is:

1. A 1:2 chrome complex dye of the formula

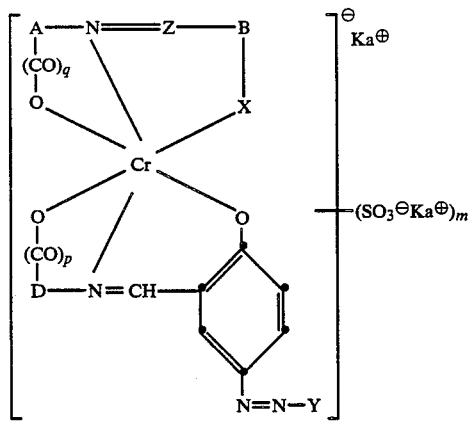

wherein
Z is nitrogen or a CH group,
A is a benzene or naphthalene radical which carries a hydroxyl or carboxyl group in the o-position with respect to the azo or azomethine group, and which is unsubstituted or further substituted by alkyl, alkoxy, halogen, nitro, cyano, sulfo, carboxyl, phosphono, alkylsulfonyl, sulfamide, alkanoylamino, alkylsulfonylamino, alkoxycarbonylamino, aroylamino and arylsulfonylamino, wherein the alkyl groups contain 1 to 6 carbon atoms;
D is the radical of an o-aminophenol or, when P=1, the radical of an aliphatic, cycloaliphatic or aromatic aminocarboxylic acid,
B is the radical of a coupling component when Z is nitrogen, the coupling component containing the group X in the o- or $\alpha$-position with respect to the azo group, or is the radical of an o-hydroxyaldehyde when Z is the CH group,
X is oxygen or, when Z is nitrogen, also a group of the formula —NR—, in which R is hydrogen or a $C_1$–$C_4$-alkyl group,
Y is a benzthiazolylphenyl radical of the formula

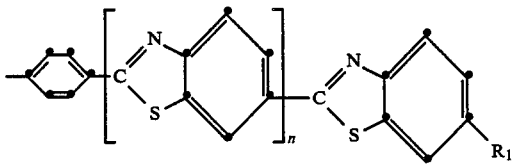

or a stilbenyl radical of the formula

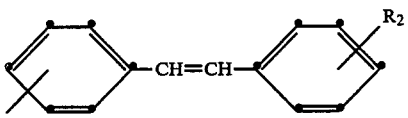

wherein
n is zero or 1,
$R_1$ is hydrogen or methyl, and
$R_2$ is hydrogen, nitro, chlorine, $C_1$–$C_4$-alkyl, $C_1$–$C_4$-alkoxy or acetylamino,
m is an integer from 1 to 6,
p is zero or 1,
q is zero or 1, and
$Ka^\oplus$ is a cation.

2. A dye according to claim 1, which contains 2 to 4 sulfo groups.

3. A dye according to claim 1, wherein A is the radical of a 1-hydroxy-2-aminobenzene, which is unsubstituted or substituted by halogen, nitro, sulfo or low-molecular alkyl or alkoxy, or is the radical of a 1-amino-2-hydroxy-4-sulfonaphthalene, which is unsubstituted or substituted in the 6-position by chlorine, nitro or sulfo.

4. A dye according to claim 1, wherein Z is nitrogen.

5. A dye according to claim 1, wherein Z is nitrogen, and B is a 1- or 2-naphthol which is unsubstituted or substituted by amino or sulfo; a 1- or 2-naphthylamine, unsubstituted or substituted by sulfo; or p-alkyl($C_1$–$C_6$)-phenol, 1-phenyl-3-methyl-5-pyrazolone or acetoacetic acid anilide, and the phenyl group in the two last-mentioned compounds is unsubstituted or substituted by C₁–C₄-alkyl, C₁–C₄-alkoxy, chlorine, nitro or sulfo.

6. A dye according to claim 1, wherein Z is a CH group, and B is the radical of an o-hydroxybenzaldehyde or o-hydroxynaphthaldehyde, which is unsubstituted or substituted by C₁–C₆ alkyl, halogen, sulfo, phenylazo, sulfophenylazo, naphthylazo or sulfonaphthylazo.

7. A dye according to claim 1, wherein D is the radical of a 1-hydroxy-2-aminobenzene, which is unsubstituted or further substituted by nitro, sulfo, chlorine, methyl or methoxy.

8. A dye according to claim 8 or 9, wherein Y is the radical of dehydrothio-p-toluidine, dehydrothio-p-toluidine-7-sulfonic acid, 4-aminostilbene-2-sulfonic acid or 4-amino-4′-nitrostilbene-2,2′-disulfonic acid.

9. A dye according to claim 1 wherein Y is a benzthiazolylphenyl radical, R₁ is methyl and n is zero.

10. A dye according to claim 1, wherein Y is a stilbenyl radical in which R₂ is hydrogen, nitro, chlorine, C₁–C₄-alkyl, C₁–C₄ alkoxy or acetylamino.

11. A dye of the formula

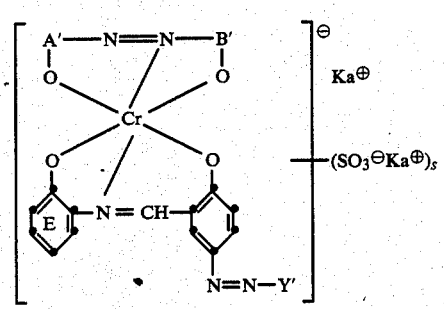

wherein

A′ is the radical of a 1-hydroxy-2-aminobenzene, which is unsubstituted or substituted by halogen, nitro, sulfo, or low-molecular alkyl or alkoxy, or is the radical of a 1-amino-2-hydroxy-4-sulfonaphthalene, which is unsubstituted or substituted in the 6-position by chlorine, nitro or sulfo.

B′ is a 1- or 2-naphthol which is unsubstituted or substituted by amino or sulfo, or a 1- or 2-naphthylamine, unsubstituted or substituted by sulfo, or is p-alkyl(C₁–C₆)-phenol, 1-phenyl-3-methyl-5-pyrazolone or acetoacetic acid anilide, and the phenyl group in the two last-mentioned compounds is unsubstituted or substituted by C₁–C₄-alkyl, C₁–C₄-alkoxy, chlorine, nitro or sulfo, Y′ is a radical of the formula

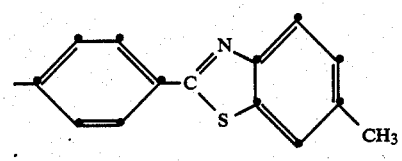

or of the formula

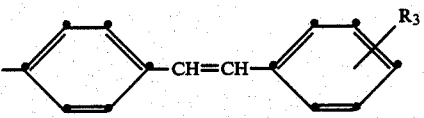

wherein

R₃ is hydrogen, nitro, chlorine, methyl, methoxy or acetylamino, and the radical are not further substituted or contain one or two sulfo groups, s is 2, 3 or 4, and Ka⊕ is a cation, and the ring E is unsubstituted or substituted by nitro, chlorine, methyl, methoxy or sulfo.

* * * * *